United States Patent [19]

Schilling et al.

[11] 4,420,526

[45] Dec. 13, 1983

[54] SOUND ABSORBING IRREGULARLY SHAPED PANEL

[75] Inventors: Hermann Schilling; Reinhard Stief, both of Weinheim, Fed. Rep. of Germany

[73] Assignee: Firma Carl Freudenberg, Weinheim, Fed. Rep. of Germany

[21] Appl. No.: 306,861

[22] Filed: Sep. 29, 1981

[30] Foreign Application Priority Data

Oct. 21, 1980 [DE] Fed. Rep. of Germany ....... 3039651

[51] Int. Cl.[3] ................................................ B32B 5/14

[52] U.S. Cl. .................................. 428/171; 181/224; 181/293; 181/294; 428/156; 428/192; 428/233; 428/280; 428/284; 428/287; 428/296; 428/297; 428/298; 428/303

[58] Field of Search ............... 428/171, 233, 284, 287, 428/296, 298, 156, 192, 297, 303, 280; 181/284, 293, 294

[56] References Cited

U.S. PATENT DOCUMENTS 3,341,394 9/1967 Kinney ................................ 428/292

*Primary Examiner*—James J. Bell

*Attorney, Agent, or Firm*—Kenyon & Kenyon

[57] ABSTRACT

A panel for sound insulation of vehicles or other devices is described which is constructed of a fabric of autogenously and chemically bonded, matted polyester fibers having fine surface pores. The fabric is shaped by compression so that it has a thickness of 1 to 3 mm. and exhibits an acoustical impedance of about 30 to about 100 Rayl.

10 Claims, 4 Drawing Figures

SOUND ABSORBING IRREGULARLY SHAPED PANEL

BACKGROUND OF THE INVENTION

The invention relates to a sound-absorbing, irregularly shaped panel of nonwoven fabric of polyester fibers.

A sound-absorbing, irregularly shaped panel of non-woven fabric is described in DE-OS 25 10 607. It is used in the engine space of a motor vehicle and is reinforced by a heat hardening resin or by thermoplastic fibers. When using the resin, undesirable clogging of part of the pore volume of the fabric fibers must be tolerated, which reduces effectiveness. Use of thermoplastic fibers causes a reduction of the shape stability as a function of increasing temperature. With both, there is an undesirable increase in weight due to the penetration of moisture.

It is therefore an object of the invention to develop a sound-absorbing panel for use in the engine compartment of a motor vehicle which exhibits a high degree of sound absorption as well as shape stability under the influence of rising temperatures. These properties are understood to mean in particular that vibrations in a frequency range of 500 to 2000 Hz are more than 50 percent absorbed and that permanent changes of shape do not occur up to a temperature of 100° C. when the panel is suspended under the hood of a motor vehicle and is anchored exclusively in the vicinity of the edges of the hood.

SUMMARY OF THE INVENTION

This and other objects are achieved by the sound-absorbing, irregularly shaped panel of the invention. The panel comprises a deep-drawn nonwoven fabric of endless polyester fibers which are autogenously bonded together and are additionally bonded together by a chemical binder or resin. The polyester fibers have a distribution of very fine pores on their surfaces. The fabric is compressed in such a manner that for a thickness of 1 to 3 mm, it has an acoustical impedance of 30 to 100 Rayl. A Rayl is a unit of specific acoustical impendance equal to a sound pressure of one dyne per sq. cm. divided by a sound particle velocity of one cm. per second. It is also known as a specific acoustical ohm.

BRIEF DESCRIPTION OF THE DRAWINGS

The drawings show two embodiment examples of the sound-absorbing panel of the invention.

DETAILED DESCRIPTION OF THE INVENTION

Figure 1:
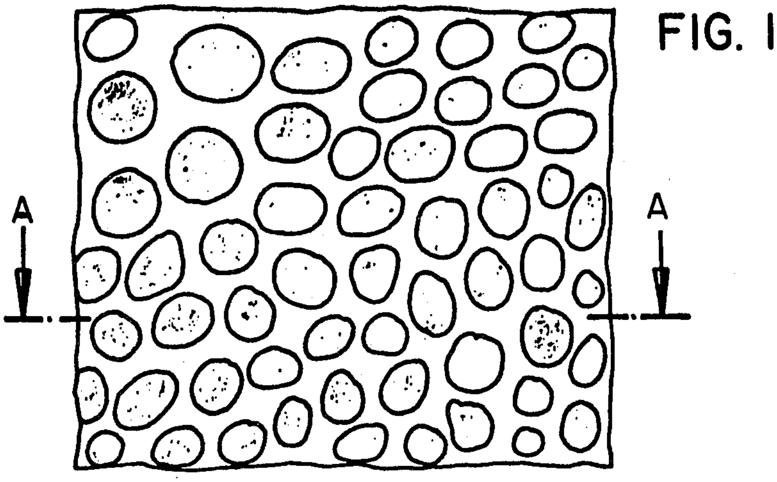
FIG. 1 shows a sound-absorbing panel in a top view. The circular projections on the surfaces of the panel are interrelated in an irregular pattern.

The panel of the invention is a fabric of endless polyester fibers which, during manufacture and formation, are deposited as a random structure mat on a carrier and are bonded together autogenously. Because of the high plasticity of the polyester fibers which exists mainly during the deposition, a very fine pore structure and distribution thereof is obtained, which has a positive effect on sound absorptivity. Extrusion of spinning methods for the production of such porous polyester fibers are known in the art. Generally, the pores are formed by gas production. For example, use of a blowing agent in the polymeric mixture to be extruded or spun or use of a solution of the polymer in a low boiling, inert organic solvent will be effective for the production of the porous structure.

After fiber formation, partial crystallization sets in subsequent to the deposition and bonding of the fibers, which stabilizes the assumed shape and the autogenous bonding of the fibers. Consequently, no changes in the inner structure of the fiber material can occur during the subsequent impregnation with a solution or dispersion of resin. The resin is deposited on the fibers preferably at points where the pore structure has been destroyed, i.e., in the immediate vicinity of the existing interfiber autogenous bonds. This may be accomplished by methods known to those skilled in the art. In particular, spraying the resin solution or dispersion on the fabric while agitating or otherwise shaking will produce the effect.

The impregnated fabric can be dried in such a manner that further orienting of the fibers and the binder is prevented, i.e., at sufficiently low temperatures and at high air velocity. Particularly, well suited is the use of a suction-cylinder dryer.

The fabric can have a change in the wall thickness which repeats at irregular spacings. This arrangement advantageously attenuates a particularly wide spectrum of sound waves of different wave lengths. Such a variation of the thickness can be produced by a final treatment between two embossing cylinders of steel which are set against each other and have different engravings on the surface. In the simplest treatment, embossing cylinders can be used which differ only by different pitch of the surface engraving on both sides. Due to the rotation of the cylinders, one obtains a continuous change of the mutual relationship of the embossed pattern and thereby, a variation of the wall thickness of the fabric which repeats at irregular spacings. The temperature of the cylinders must be set so that the pattern of the embossing cylinder is precisely transferred to the fabric while avoiding crystallization of the fibers and the resin. During the embossing, the resin is preferably converted to the beta-state, i.e., a cross-linked state which can be reactivated by further heating. During the embossing, the fabric is compressed to the extent necessary.

For sound waves having lengths which vary within a narrow range, improved effectiveness can be achieved through the use of a fabric which has regularly repeating variations of the wall thickness. The mutual distance between these variations should be 10 to 30 times as large as the maximum thickness of the fabric. In an embodiment of this kind the respective variations of the wall thickness can be interrelated with each other in such a manner that an additional stiffening of the fabric against flexural stresses is obtained. This stiffening supplements other stiffening measures such as creases or folding edges.

In a further version of this embodiment, the variations can take a stepwise configuration and the fabric will have zones in the intermediate regions between the variations with essentially constant wall thickness. This results in an improvement of the mechanical strength, in addition to an improvement of the absorptivity. Further, by applying a surface layer of an airpermeable cloth, the entry of dirt and moisture can be substantially prevented without any appreciable reduction of the absorptivity. This arrangement has the advantage of providing permanent assurance of good use properties in the engine space of a motor vehicle.

Although very low resin concentrations are used for the chemical bonding, excellent stiffening of the matted individual fibers is provided thereby. The chemical bonding helps to prevent covibration of the fibers with the sound waves and, after the polyester fibers are completely crystallized and the resin is completely cross-linked, excellent acoustic effectiveness is obtained.

The final crystallization of the fibers as well as the cross-linking of the binder can be effected in a closed operation during the final deep drawing. To this end, the non-woven fabric is brought quickly to the required temperature, for instance, by exposure to infrared radiation or by conduction heating with hot air, and is deep-drawn into the desired shape through pressing and/or application of vacuum. The shape can basically be chosen at will; the depth of the box-like body obtained, however, should be at least 20 times as large as the maximum thickness of the fabric in order to obtain good sound absorption properties. The flat bottom surface can be stabilized by drawn-in folds to improve the form stability.

The features and characteristics of the invention are further illustrated by the following description of the embodiments depicted in the Figures.

Figure 2:
FIG. 2 shows the panel according to FIG. 1 in a longitudinal cross section.
Figure 3:
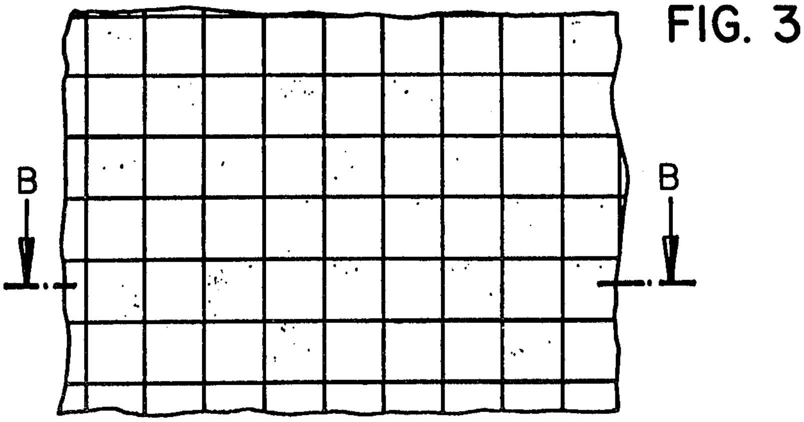
FIG. 3 shows a panel in which the two surfaces of the fabric have regular pattern embossings, the two patterns being interrelated in a regular manner.
Figure 4:
FIG. 4 shows the panel according to FIG. 3 in a longitudinal cross section.

The panel of the invention depicted in FIG. 1 is a thin spun formed fabric with a thickness of between 1 and 3 mm and an area weight of 200 to 800 g/m$^2$. The fabric is formed so that its edges join the housing part to be lined and, optionally, the intermediate regions of the panel may also join the housing part to be lined. With respect to the other regions of the panel, a space of about 40 to 50 mm is present between the panel and the housing part to be lined. The matted fibers used as the self-supporting fabric panel are compressed in such a manner that the panel has a flow resistance between 30 and 120 and preferably between 70 and 100 Rayl. The flow resistance is adjusted by compression of the fabric at constant thickness or by simultaneous embossing in the shape shown. The embossing can be described as circular raised projections which stand out in relief-fashion and are arranged above both surfaces with a height of 0.8 to 1 mm. The embossing patterns are interrelated in a statistical distribution, and the diameter for all is the same. For the embodiment shown in FIG. 1, the diameter of the projections is 20 mm. At its thickest point, the bonded fabric panel has a thickness of 3 mm, and at the thinnest point a thickness of 1 mm. The profile of the panel shown in FIG. 1 obtained along an imaginary cross section line A—A' is illustrated by FIG. 2.

In a modified embodiment, not shown, a fabric panel is provided with circular relief projections which are arranged on both surfaces, the diameter of which is statistically varied with a statistical mutual interrelation in a range from 5.0 to 40 mm. According to further embodiments, now shown, it is provided that the superficial projections have oval or polygonal boundaries.

The filaments have a diameter of 4 to 12 denier and they are made from a polyester such as poly(ethylene terephthalate). They are deposited in a finely twisted manner, as a mat and frequently intercept each other. They are bonded together autogenously at their interception points. The mat is additionally stabilized by a cross-linked binder which encloses the filaments in the vicinity of the autogenous bond. The binder is applied into the fabric preferably by an impregnation with subsequent squeezing-off or by brushing. The binder is activated and cemented by a drying operation.

In an embossing calendar, the cylinders of which have a surface temperature of about 80° C., the thickness of the fabric is varied continuously in the chosen manner. Complete crystallization of the polyester filaments and the complete setting of the binder takes place during the deep-drawing operation. For this purpose the fabric is heated and immediately thereafter is deformed and cut in a pressing tool. After subsequent cooling, the formed part obtained is ready for installation.

If a covering layer is to be applied to the surface, a typical woven cloth for this purpose will have an area weight of 80 to 160 g/m$^2$. A non-woven cloth of fine fibers, which is useful for this purpose will have a strength of 0.5 to 2 denier and an area weight of 50 to 100 g/m$^2$. When employing a cloth covering, it is advisable to place the cloth together with the prepared and impregnated fabric into the heating press used for deep drawing. The heat reactivation of the binder immediately before it is cross-linked will typically cause sufficient bonding of the cloth and fabric.

Because of its thin wall, the panel of the invention will dry quickly after it has been moistened by water or rain. If substantial soiling occurs from oils, grease, dirt and the like, cleaning with customary high pressure cleaning equipment is possible without damage.

The panel of the invention has less weight than known sound absorption materials, but provides an equivalent amount of sound deadening per area. This advantage meets the intensive desire of the automobile industry to provide for weight saving. A further advantage is that the manufacturing costs are lowered relative to known embodiments.

We claim:

1. A sound absorbing, irregularly shaped panel comprising a deep-drawn, non-woven fabric of matted endless intersecting polyester fibers, said fibers having a denier of from about 4 to 12, and a distribution of fine pores on their surfaces, said fibers being autogenously bonded together at their points of intersection and bonded together in the immediate vicinity of said intersection points by a cross-linked chemical binder, so as to prevent covibration of said fibers in response to absorbed sound waves, said fabric being compressed to a degree such that a shaped panel having a thickness of 1 to 3 mm has an acoustical impedance of from about 30 to about 100 Rayl.

2. A panel according to claim 1 which further comprises a layer of woven or nonwoven air permeable, thin cloth bonded to the outer surface of the fabric.

3. A panel according to claim 1, wherein the thickness of the fabric repeatedly varies at irregular intervals.

4. A panel according to claim 1, wherein the wall thickness of the fabric regularly and repeatedly varies and the distance between the variations is ten to thirty times as large as the maximum thickness.

5. A panel according to claim 3 or 4, wherein the variations in the fabric thickness are made in steps and the fabric has zones in the spaces between the variations which are substantially of the same thickness.

6. A panel according to claim 2 wherein the fabric has bonded to it a layer of a woven cloth.

7. A panel according to claim 1, 2, 3 or 4 wherein the fabric is stiffened by creases or folded edges.

8. A panel according to claim 3 or 4 wherein the variations in the fabric thickness are circular projections arranged in relief fashion above the surfaces of the fabric.

9. A panel according to claim 8 wherein the projections have a height of about 0.8 to 1 mm. above the surfaces of the fabric.

10. A panel according to claim 1, 2, 3 or 4 wherein the polyester of the fibers in the fabric has substantially crystallized and a substantially even distribution of fine surface pores is present.

* * * * *